Aug. 15, 1950

J. A. MAURER, JR  
VIEW FINDER FOCUSING AND PARALLAX ADJUSTMENT MECHANISM 2,519,195

Filed May 7, 1947

INVENTOR:  
JOHN A. MAURER, JR.  
BY Otto J. Nathansohn  
AGENT

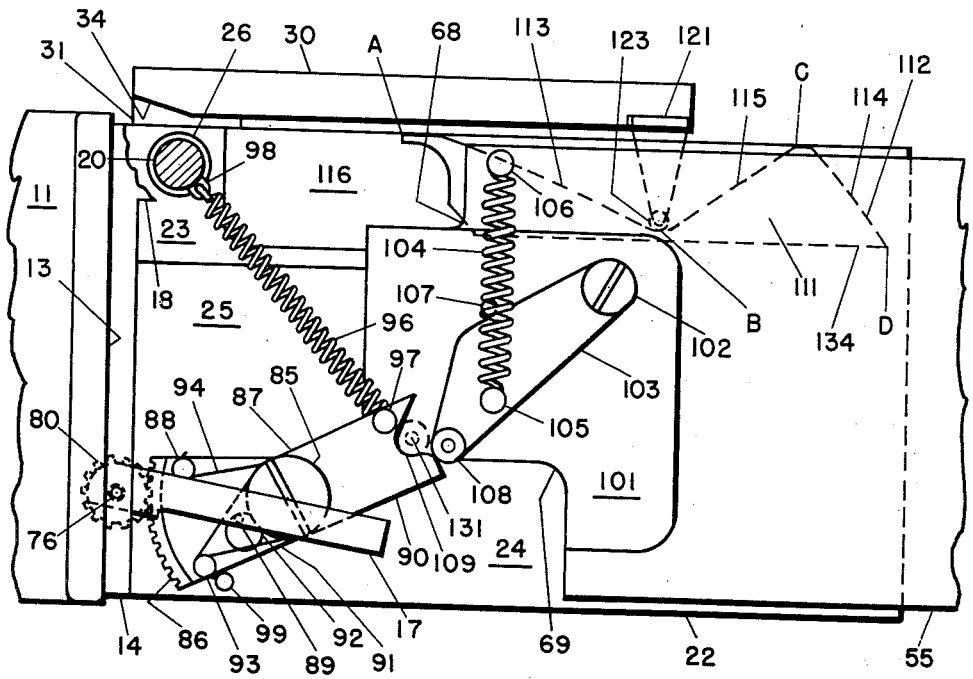

Aug. 15, 1950
J. A. MAURER, JR
VIEW FINDER FOCUSING AND PARALLAX
ADJUSTMENT MECHANISM
2,519,195
Filed May 7, 1947
5 Sheets-Sheet 3
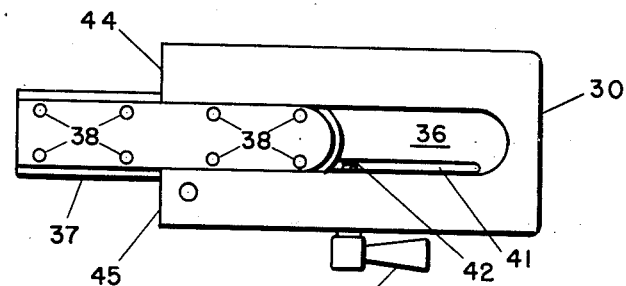
FIG. 5
FIG. 4
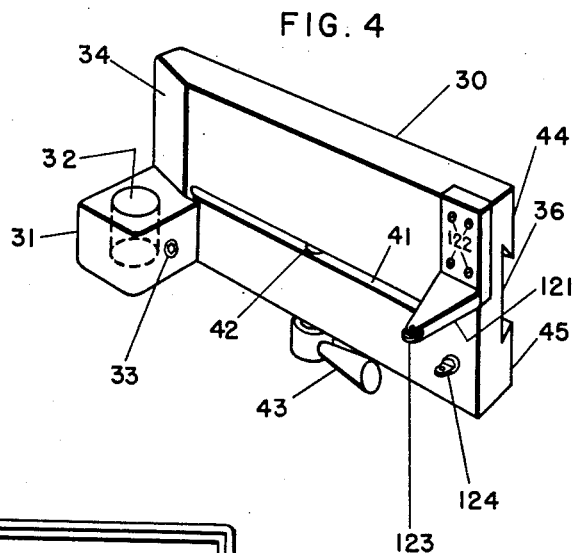
FIG. 7
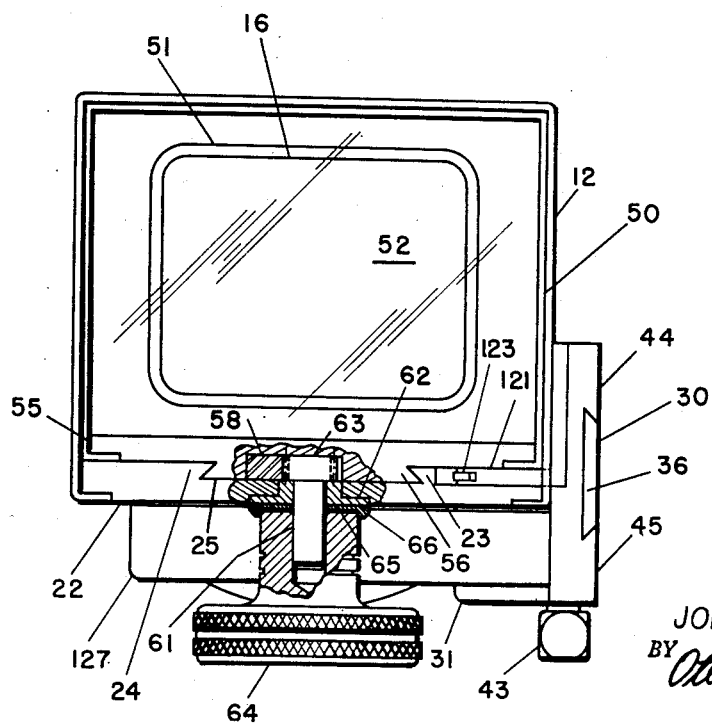
INVENTOR:
JOHN A. MAURER, JR.
BY *Otto J. Nathansohn*
AGENT Aug. 15, 1950

J. A. MAURER, JR
VIEW FINDER FOCUSING AND PARALLAX
ADJUSTMENT MECHANISM 2,519,195

Filed May 7, 1947

*INVENTOR:*
JOHN A. MAURER, JR.

BY
AGENT

Aug. 15, 1950         J. A. MAURER, JR         2,519,195
                 VIEW FINDER FOCUSING AND PARALLAX
Filed May 7, 1947        ADJUSTMENT MECHANISM
                                              5 Sheets-Sheet 5

*INVENTOR:*
JOHN A. MAURER, JR.
BY Otto J. Nathansohn
AGENT

Patented Aug. 15, 1950

2,519,195

UNITED STATES PATENT OFFICE 2,519,195

VIEW FINDER FOCUSING AND PARALLAX ADJUSTMENT MECHANISM

John A. Maurer, Jr., New York, N. Y., assignor to J. A. Maurer, Inc., Long Island City, N. Y., a corporation of New York Application May 7, 1947, Serial No. 746,565

14 Claims. (Cl. 88—1.5)

This invention relates to view finders such as are used in conjunction with cameras and, more specifically, to the focusing and parallax adjustment mechanism therefor.

More particularly, the invention relates to view finders having, on one side of the camera, a vertical pivot about which they are adapted to be swung so that their angle of inclination with respect to the camera may be altered. This arrangement is for effecting parallax adjustment by bringing the field of view of the view finder objective into coincidence with that on which the camera objective is focused.

A preferred mechanism for effecting parallax adjustment involves the employment of a cam, and of a cam finger engaging it. But, in the known constructions of this kind, the cam is mounted, either on the finder or on the camera, in such a manner that it is freely accessible from the outside and its active surface hence fully exposed to dust, dirt, and other accidental damage to its proper functioning.

It is, therefore, an object of the invention to provide, in a view finder, a parallax adjustment cam whose surface is positively protected against damage of the above kind. For that reason, the invention proposes the employment of an elongated cam member which extends horizontally within the finder housing and is engageable, preferably through a slot in the side wall of the housing, by the cam finger which is mounted to the side wall of the camera. This construction also makes it possible to assemble the finder pivot and the cam finger on a mounting means, such as a clamp, which may be detachable from the camera so that the view finder may easily be removed therefrom for inspection and repair, and for independent use, for example, for studying camera angles on a set. Since, on the other hand, the support for the mounting means need take up only very little space on the side wall of the camera, the view finder according to the invention can readily be made for attachment to a camera of almost any construction.

Accordingly, it is a further object of the invention to provide a view finder which, including its parallax adjustment mechanism, may readily be attached to a camera, and easily be detached therefrom.

In addition to being aimed at the same field of view, the finder objective must also be focused on it, and it is desirable to provide mechanism which simultaneously focuses the finder objective and effects parallax adjustment for the particular field of view on which it is focused. Ordinarily, the finder objective is focused by displacing it along its axis whereby its distance from the parallax pivot is changed. If, for example, the objective is closest to the pivot in its infinity position, it has to be advanced for viewing objects at short distances from it. This forward movement of the objective with respect to the stationary pivot may well constitute an appreciable fraction of its distance from the object so that the object will be viewed by the finder objective at a perspective which is markedly different from that at which it is viewed by the camera objective, and the purpose of the parallax adjustment is at least partially defeated.

It hence is another object of the invention to provide a focussable view finder whose objective stays at a fixed distance from the parallax pivot, no matter what angular position the finder housing assumes with respect to the camera. This object of the invention is achieved by using the objective at a fixed position within the housing, and by bringing the image formed by it into proper focus by moving the ground glass of the finder optical system towards and away from the objective. A common carrying means then is preferably provided for the ground glass and the elongated cam member so that the parallax adjustment is effected simultaneously with the focusing operation.

It is at times desirable to provide, for use with the view finder, a number of interchangeable objectives of different focal lengths. Each objective requires an especially shaped cam surface for proper parallax adjustment and, heretofore, it has been necessary to provide as many cams as surfaces were required. But with the horizontally extending elongated cam member of the invention, it is possible to provide on the cam surface as many especially shaped active portions as are needed, which portions then are successively engageable by the cam finger. Intricate, and not always reliable, mechanism for selecting a cam and bringing it into operative position is thereby avoided and it, consequently, is still another object of the invention to simplify, and improve, the operation of a view finder in which a plurality of differently shaped cam surfaces are required for parallax adjustment.

There are various ways in which the interchangeable objectives may alternatively be brought into the fixed position within the finder housing. In a presently preferred embodiment of the invention, however, an objective is rigidly mounted at the fixed position, and an auxiliary lens can be swung into the path of the light rays proceeding from the objective towards the ground glass. Thereby, the normal focal length of the objective is altered so that the arrangement constitutes two interchangeable objectives of different focal lengths. Two active portions are provided for the two objectives on the surface of the elongated cam member, and also mechanism for controlling the position of the auxiliary lens. The control mechanism is actuated by the means carrying the ground glass and the cam member in such a manner that first focusing and parallax adjustment is effected for the normal focal length, then the auxiliary lens is interposed between the objective and the ground glass, and finally focusing and parallax adjustment is effected for the altered focal length. This operation is fully automatic, and use of the proper cam surface portion is positively insured by the apparatus whose provision is yet another object of the invention.

Still other objects and advantages of the invention include those which are hereinafter stated or apparent, or which are incidental to the invention.

It should be noted that the terms "vertical" and "horizontal" have been used in the foregoing brief summary of the invention and its objects, and will be used throughout this specification, not in any absolute sense but merely as indicating two directions at right angles to each other, and that choice between these terms has been determined solely by convenience in description and illustration. The terms "front" and "forward," furthermore, denote direction towards the object to be viewed, and the terms "rear" (or "back") and "rearward" denote direction towards the observer. The terms "inner" and "inward," finally, denote direction towards the camera, and the terms "outer" and "outward" direction away from the camera.

The invention will be better understood when the following description is considered with the accompanying drawings of certain presently preferred embodiments thereof, and its scope will be pointed out in the appended claims.

In the drawings:

Fig. 3 is a perspective view, drawn to the scale of Fig. 2, of the other part of the finder housing including a portion, shown in section, of the part shown in Fig. 2;

Fig. 4 is a perspective view of the clamp which pivotally carries the finder housing;

Fig. 5 is an elevation of the camera side of the clamp shown in Fig. 4, and of a support adapted to be mounted on the camera body;

Fig. 7 is a rear elevation, drawn to the scale of Fig. 2, of the view finder of Fig. 1;

Fig. 9 is a top elevation, drawn to the scale of Fig. 2, of an assembly consisting of a portion of the part shown in Fig. 2, the clamp shown in Fig. 4, a portion of the plate shown in Fig. 8, and the base plate of the part shown in Fig. 3, a shaft mounted in the latter plate being shown in cross-section;

Figure 1:
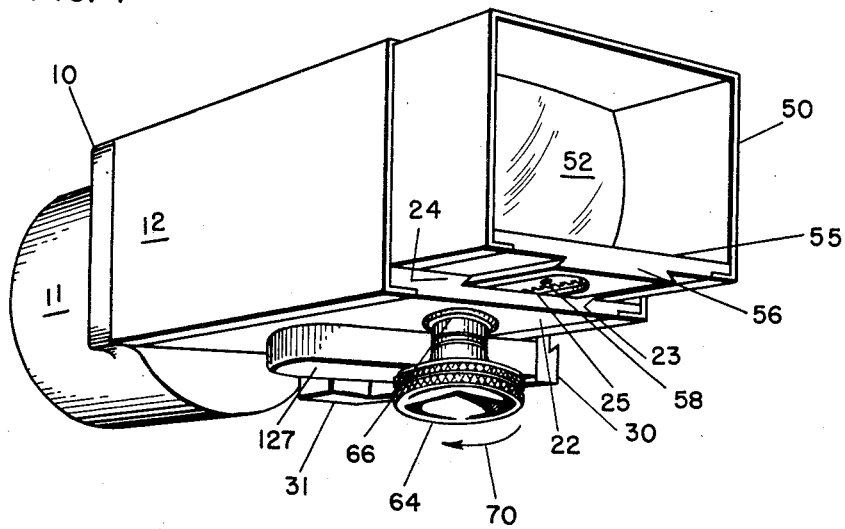
Fig. 1 is a perspective view of a view finder according to the invention.
Figure 2:
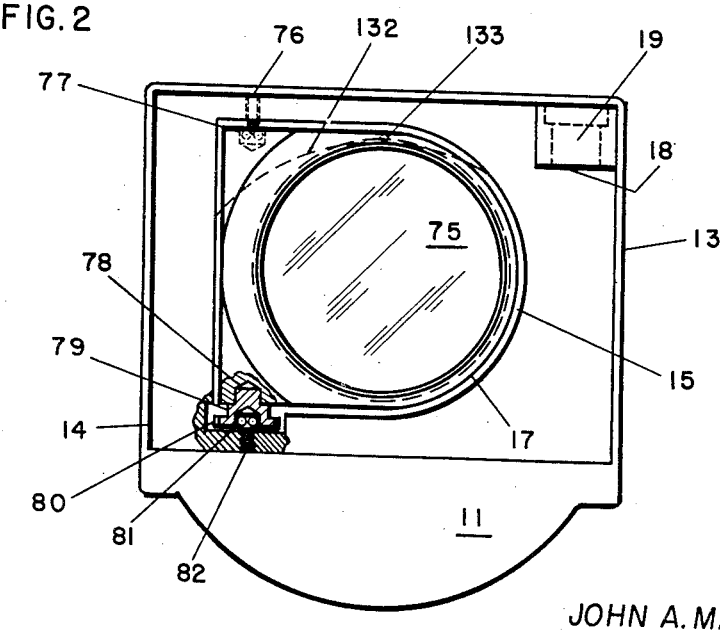
Fig. 2 is an enlarged rear elevation of one part of the finder housing.

Referring first to Figs. 1 to 3, the view finder shown in the drawing has a housing 10 which consists of a hollow front cap 11 and a shell 12. Within front cap 11 there is fixedly mounted the view finder objective (not shown) which may consist of a well known lens-prism-combination forming a reduced image which is erect and correct right-to-left.

Front cap 11 is, in general, of a cylindrical shape. It has a rear wall 13 with a portion 14 which is raised and recessed so that shell 12 may be slipped over it when front cap 11 and shell 12 are assembled to form housing 10; the two parts then being fastened to each other by screws or similar means (not shown).

Portion 14 has a cut-out 15 of such a shape as to permit the light rays passing through the finder objective to proceed towards the ground glass 16 within shell 12, and to accommodate a lens holder 17 for a purpose to be explained hereinafter. A boss 18 extends from portion 14, and has a counterbored hole 19 for the reception of a shaft 20 whose flat head 21 rests on the counterbore of hole 19.

Shell 12 is an oblong of rectangular cross-section. It has a base plate 22 with two raised portions 23 and 24 which form the rails of a dovetail way 25. At the front end of shell 12 there is provided in portion 23 a bearing 26 whose bore is in alignment with hole 19, and through which the end 27 of shaft 20 protrudes from shell 12.

Figure 6:
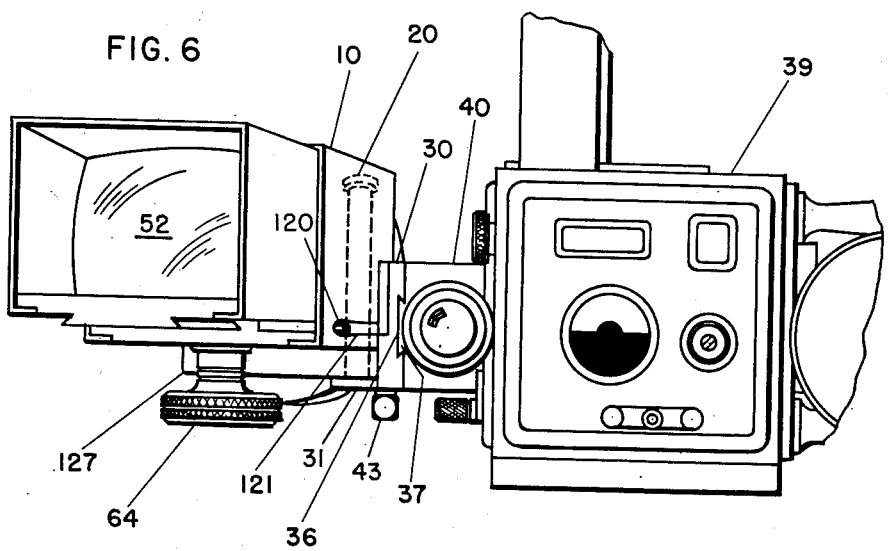
Fig. 6 is a somewhat diagrammatic perspective view on a reduced scale showing the view finder of Fig. 1 attached to a motion picture camera.

Referring now to Figs. 4 to 6, a clamp 30 supports at the front end of its finder side a block 31 which is provided with a blind tap 32 for receiving the end 27 of shaft 20. End 27 has a flat (not shown) which is engaged by a set screw 33 threaded into block 31 so that shaft 20 is rigidly connected to clamp 30. Since, on the other hand, shaft 20 is freely rotatable in hole 19 and bearing 26, it acts as a pivot for housing 10 which thus is, near its front end, pivotally supported by shaft 20. To permit housing 10 to swing through a sufficiently large arc, clamp 30 is suitably flattened as at 34.

On its camera side, clamp 30 has a dove-tailed recess 36 into which fits a dove-tail support 37. Support 37 has holes 38, 38, for receiving screws (not shown) by means of which it may be attached to a suitable portion of the camera body 39, for example, to the housing 40 of the camera focusing system. A slot 41 is cut into clamp 30 within the area of recess 36, and a screw 42 is threaded into clamp 30 so as to traverse slot 41. After recess 36 has been slipped over support 37, screw 42 is tightened by turning its handle 43 so as slightly to pull the jaws 44 and 45 of recess 36 together whereby clamp 30 is firmly secured to support 37.

Support 37 extends horizontally so that, when clamp 30 with housing 10 is attached to camera body 39, shaft 20 extends vertically, and housing 10 pivots about shaft 20 through a horizontal plane. It will thus be seen that, by virtue of the arrangement so far described, the view finder objective stays at a fixed distance from the pivot about which the view finder is adapted to swing, no matter what angular position housing 10 assumes with respect to camera body 39.

Referring next to Figs. 1, 3, 7, and 8, ground glass 16 is carried within shell 12 by an inner tube 50 to which it is suitably attached by means of a holder 51. For observing the image formed on ground glass 16 by the view finder optical system, a magnifier 52 is likewise mounted within tube 50 and at a fixed distance rearwardly of ground glass 16.

Inner tube 50 is an oblong of a rectangular cross-section which is slightly smaller than that of shell 12. It has a base plate 55 which is, on its bottom side, provided with a dove-tail 56. Dove-tail 56 fits the way 25 on the base plate 22 of shell 12 so that tube 50 may slide into, and out of, shell 12, and it has a recess 57. On the side away from the camera, there is provided within recess 57 a rack 58 with teeth 59; rack 58 being secured to plate 55 by means such as the screws 60, 60.

A shaft 61 is mounted for rotation near the rear end of the base plate 22 of shell 12. To that end, it is journalled in the flanged bushing 62 which is inserted into a counterbored hole in plate 22. On the top side of plate 22, shaft 61 has rigidly attached to it a pinion 63 which meshes with rack 58, and on the bottom side of plate 22, a knurled knob 64 is fixedly mounted on shaft 61 and separated from plate 22 by a spring washer 65 and a retaining washer 66.

Figure 10:
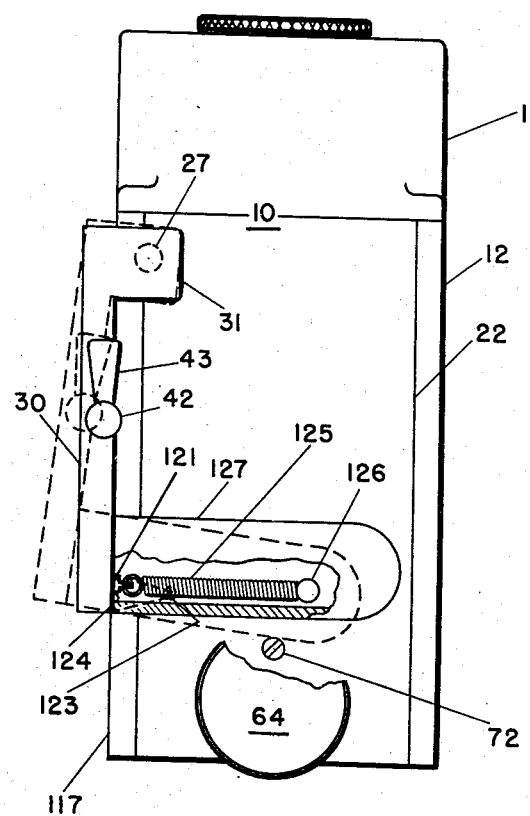
Fig. 10 is a bottom elevation of the view finder shown in Fig. 1 with a knob and a cover plate being partly broken away.

Inner tube 50 is somewhat shorter than shell 12 so that, when the rear ends of tube 50 and shell 12 are in alignment, as shown in Fig. 7, the front end of tube 50 touches portion 14 on front cap 11. For that reason, parts of tube 50 are cut away as at 67 and 68 to obtain space for boss 18 and shaft 20, respectively, and at 69 for a similar purpose. Tube 50 may then be pulled out of shell 12 and into the positions shown in Figs. 1 and 6, for example, by turning knob 64 counter-clockwise as indicated by the arrow 70 in Fig. 1. This rearward movement of tube 50 is arrested when the front rim 71 of recess 57 engages the stop screw 72 which protrudes into way 25 in front of pinion 63 (see Fig. 10). By suitably turning knob 64, therefore, ground glass 16 may be moved towards and away from the view finder objective for the purpose of bringing the image on ground glass 16 into proper focus.

Referring further to Figs. 2, 3, and 9, the view finder objective is of a general purpose focus. That is to say, its focal length is chosen so that it can be used with a number of camera objectives of different focal lengths provided that its field of view can be corrected by a masking device (not shown) which may be of a suitable conventional design. But when a wide-angle camera objective is employed, the focal length of the finder objective is shortened in order sufficiently to widen the finder field so that it may readily be made to correspond to the field covered by the wide-angle objective. This is done by interposing between the finder objective and ground glass 16 an auxiliary lens 75 of suitable characteristics. Lens 75 is mounted in holder 17, and holder 17 is pivotally disposed within the cut-out 15 of portion 14. To that end, a pointed set screw 76 is threaded into portion 14 from its top side and engages a ball bearing 77 suitably inserted into the top of holder 17. A hole 78 is drilled into the bottom of holder 17 and opposite bearing 77, and into hole 78 there is partially inserted the hub 79 of a pinion 80. On the side opposite hub 79, pinion 80 is suitably recessed so that a ball bearing 81 can be mounted in it, and bearing 81 is engaged by a set screw 82 threaded into portion 14 from its bottom side.

In the position of holder 17 shown in Fig. 2, lens 75 is between ground glass 16 and the finder objective whose focal length thus is shortened, while in the position of holder 17 shown in Fig. 9—in which position an angle of approximately 100° is formed between holder 17 and portion 14—lens 75 is out of the path of the light rays proceeding from the finder objective towards ground glass 16. Mechanism for controlling the position of holder 17 is provided as follows:

A stud 85 is mounted near the front end of rail 24 on shell base plate 22, and mounted for rotation about stud 85 are a gear segment 86 and an actuating lever 87. Gear segment 86 is in mesh with the pinion 80 on holder 17, and has mounted on it a stud 88 and a pin 89. Lever 87, which is on top of gear segment 86, has a broad rear arm 90 and a pointed front arm 91. In arm 91, there is provided a round hole 92 into which pin 89 protrudes, and at the front end thereof there is mounted a stud 93. A compression spring 94 is kept in position by the head of stud 85, and mounted over studs 88 and 93 so as to push gear segment 86 inwardly and lever 87 outwardly until pin 89 is engaged by the inner rim of hole 92 as shown in Figs. 3 and 9. Suitable spacers and washers (not shown) may be provided on stud 85 for separating gear segment 86, lever 87, and spring 94, and in order to insure smooth operation.

One end of a coil spring 96 is attached to a stud 97 on the arm 90 of lever 87, and its other end, by means of a holder 98, to shaft 20. Spring 96 thus pulls arm 90 towards shaft 20 so that lever 87 swings counter-clockwise about its pivot 85 until its swing is arrested by the stop pin 99. On this outward travel, arm 91 of lever 87 carries with it gear segment 86 because the inner rim of hole 92 pushes pin 89 before it. Gear segment 86 hence likewise swings counter-clockwise about its pivot 85 and, thereby, rotates pinion 80 clockwise. When, therefore, lever 87 and gear segment 86 have made contact with pin 99, holder 17 has the position shown in Fig. 9, and in which it is held by the force of spring 96.

Inner tube base plate 55 has on its top side a recess 101 of suitable configuration and, within recess 101, there is mounted on plate 55 a stud 102 which serves as a pivot for the toggle lever 103; suitable washers (not shown) being provided also on stud 102 for insuring smooth operation. A coil spring 104 is fastened to a stud 105 on lever 103 and to a holder 106 on plate 55 so as to pull lever 103 inwardly towards the stop 107. Lever 103 is a one-armed lever, and carries at its front end a roller 108 for which a seat 109 is provided at the rear end of the arm 90 of lever 87 for a purpose to be discussed hereinafter.

Referring lastly to Figs. 3, 4, 8, 9, and 10, there is fastened, by means of screws 110, 110, to the bottom side of inner tube base plate 55 an elongated cam member 111. Member 111 is on the inward side of dovetail 56, and extends parallel to rack 58. It has a cam surface 112 with two active portions 113 and 114, and an idling portion 115; portion 113 extending between the positions A and B, portion 115 between the position B and C, and portion 114 between the positions C and D, on surface 112. To accommodate member 111 when base plates 22 and 55 are assembled, a suitable portion of rail 23 is cut away to form a recess 116. Member 111 thus is fully enclosed by plates 22 and 55 and the side wall 117 of shell 12 so that surface 112 is positively protected against dust, dirt, and accidental damage.

Cam surface 112 faces inwardly so as to be at a varying distance from camera body 39 when the view finder is attached to the camera by means of clamp 30 and support 37. It, furthermore, is adapted to be engaged, through a slot 120 in side wall 117, by a right-angled cam finger 121. Cam finger 121 is mounted by screws 122, 122, or like means, to the rear end of the finder side of clamp 30 so as to be in back of shaft 20, and carries at its active, or engaging, end a roller 123 in order to reduce friction. Underneath cam finger 121 there is attached to clamp 30, by means of the holder 124, one end of the coil spring 125 whose other end is secured to a stud 126 mounted on the bottom side of shell base plate 22 and rearwardly of shaft 20. Spring 125 tends to swing housing 10 about shaft 20 as a pivot, and to pull it as close to clamp 30 as is possible in a given position of engagement between cam finger 121 and cam surface 112. Spring 125 thus maintains cam finger 121 and cam surface 112 in engagement by yieldingly urging housing 10 against clamp 30, and hence camera body 39.

As shown, by way of example, in Figs. 1, 6, 7, and 10, a protective cover 127 for spring 125 may be suitably mounted on clamp 30 if it is so constructed as to permit, within the area of plate 22 covered by it, the slight angular displacement of spring 125 caused by the rotation of housing 10 about shaft 20. This condition is, for the sake of simplicity, illustrated in Fig. 10 by the broken line position of clamp 30 and cover 127; it being understood that, actually, housing 10 and spring 125 move, while clamp 30 and cover 127 are stationary.

The proportions and relative positions of the various parts constituting the mechanisms for slideably displacing inner tube 50 with respect to shell 12, for controlling the angular position of lens holder 17 with respect to the rear wall 13 of front cap 14, and for altering the angle of inclination of housing 10 with respect to camera body 39, are chosen so that these parts co-operate as follows:

Let it be assumed that the view finder is attached to the camera as shown in Fig. 6, and that, by turning knob 64 counter-clockwise, inner tube 50 has been completely pulled out of shell 12. Cam finger 121 then engages cam surface 112 at position A, and the levers 87 and 103, gear segment 86, and lens holder 17, are in the positions shown in Fig. 9 but with toggle lever 103 being separated from actuating lever 87 by the distance *a* indicated in Fig. 8. Since, furthermore, position A is a position of closest proximity of cam surface 112 with respect to camera body 39, cam finger 121 pushes the rear end of housing 10 away from camera body 39 so that housing 10 assumes a maximum inclination with respect to body 39. Consequently, holder 51 is mounted in inner tube 50 so that ground glass 16 is, with its image receiving surface, at the close-up end of the normal focusing range of the finder objective; the position of that surface with respect to rack 58 and cam member 111 being indicated by the broken line 130 in Fig. 8.

When now knob 64 is turned clockwise, inner tube 50 slides back into shell 12, and thereby carries ground glass 16 through the normal focusing range to the infinity end thereof. At the same time, portion 113 of cam surface 112 travels past cam finger 121 until finger 121 engages cam surface 112 at position B. Since, furthermore, cam surface 112 is at position B so far away from camera body 39 that cam finger 121 can, through slot 120, fully extend into recess 116, spring 125 now pulls housing 10 flatly against clamp 30 as shown, for example, in Fig. 1. Accordingly, the contour of portion 113 is shaped so that parallax adjustment is effected during the use of the normal focusing range.

While ground glass 16 and cam surface 112 travel as described in the preceding paragraph, levers 87 and 103, gear segment 86, and holder 17, do not change their positions except in so far as the distance between levers 87 and 103 diminishes until the two levers are as close together as shown in Fig. 9. But when now the clockwise rotation of knob 64 is continued, roller 108 enters seat 109 and—as soon as it is firmly seated therein, which condition is indicated by the broken circle 131 in Fig. 9—lever 103 overcomes the force of spring 104 and starts swinging counter-clockwise about its pivot 102. Thereby, roller 108 is carried outwardly, and hence pushes arm 90 outwardly so that the force of spring 96 is overcome and lever 87 swings clockwise about its pivot 85. This movement of lever 87 is communicated, by means of spring 94, to gear segment 86 which hence likewise swings clockwise about pivot 85, and thus causes pinion 80 to rotate counter-clockwise so that holder 17 is swung from the position shown in Fig. 9 into the position shown in Fig. 2.

The swing of holder 17 is arrested when it hits the flange 132 which extends from rear wall 13 into cut-out 15; a stop 133 made of a suitable elastic material being provided on flange 132 in order to absorb the shock and so to prevent damage to lens 75. By this time, ground glass 16 has arrived at the close-up end of the wide-angle focussing range which has been established by the interposition of lens 75 between ground glass 16 and the finder objective. Simultaneously, portion 115 of cam surface 112 has traveled past cam finger 121 which now engages cam surface 112 at position C. This position is as close to camera body 39 as position A so that housing 10 again assumes its maximum inclination with respect thereto. Portion 115, finally, is a straight line whose angle of inclination with respect to the base 134 of cam member 111 is chosen so that it hits position C at the distance *b* from position B; distance *b* being the distance which inner tube 50 must travel in order that the swing of holder 17 by completed.

Upon further clockwise rotation of knob 64, inner tube 50 moves further back into shell 12 until it hits portion 14 on front cap 14. It thereby carries ground glass 16 through the wide-angle focusing range to the infinity end thereof. At the same time, portion 114 of cam surface 112 travels past cam finger 121 until finger 121 engages cam surface 112 at position D. At this position, cam surface 112 is again so far away from camera body 39 that cam finger 121 again fully extends into recess 116, and spring 125 again pulls housing 10 flatly against clamp 30 as shown in Fig. 7. Accordingly, the contour of portion 114 is shaped so that parallax adjustment is affected during the use of the wide-angle focusing range.

Figure 8:
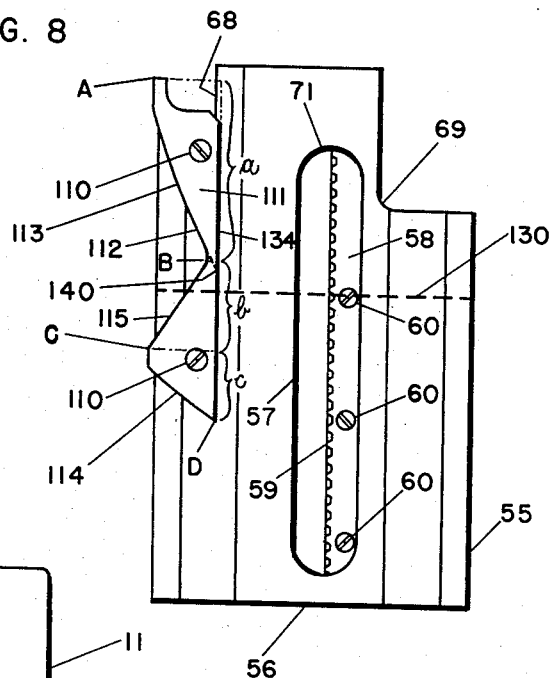
Fig. 8 shows in elevation the bottom side of the base plate of an inner tube employed in the view finder of Fig. 1.

While ground glass 16 and cam surface 112 travel as described in the preceding paragraph and thereby cover the distance marked *c* in Fig. 8, holder 17 remains in the position shown in Fig. 2 for the following reasons:

The arrest of holder 17 by flange 132 causes gear segment 86 to cease swinging about pivot 85. But, since lever 103 has not quite reached yet its position of greatest throw with respect to lever 87, it continues to turn lever 87 clockwise. Since, on the other hand, gear segment 86 cannot yield anymore in a clockwise direction, the continued rotation of lever 87 compresses spring 94, and causes the inner rim of hole 92 to disengage itself from pin 89. Shortly afterwards, lever 103 reaches its position of greatest throw so that now lever 87, too, ceases swinging about pivot 85. Lever 103 continues to swing about pivot 102 until the operation is completed, but the arc through which it swings, is so small that it keeps arm 99 substantially in its outermost position; the parts being at the end of the operation in the position shown in Fig. 3. From its arrest by flange 132 on, therefore, holder 17 is tightly locked in the position of Fig. 2 on account of the pressure exercised by lever 103 through lever 87 and spring 94 on gear segment 86.

Pulling inner tube 50 out of shell 12 by rotating knob 64 counter-clockwise reverses the operation of the lens holder control and parallax adjustment mechanisms which, in general, function in the manner explained hereinabove. It will be understood, however, that, during the period of travel indicated by the distance $b$ in Fig. 8, spring 104 now is gradually permitted to pull the toggle lever 103 towards the stop 107. Lever 103 hence gradually releases the actuating lever 87 which, therefore, is pulled by spring 96 so as to swing about pivot 85 in a counter-clockwise direction, thereby carrying with it gear segment 86 because the inner rim of hole 92 pushes against pin 89.

It will thus be seen that the invention provides a view finder having two interchangeable objectives of different focal lengths, two active cam surfaces each of which is adapted for parallax adjustment in conjunction with a particular one of the two objectives, and foolproof and fully automatic mechanism for interchanging the objectives and positively insuring the co-operation of the proper cam surface. It will be understood by those skilled in the art, however, that the invention may well be modified to involve manual interchange of the two objectives, for example, by providing for manual operation of lens holder 17 from the outside of housing 10, in which case gear segment 86, lever 87, and lever 103, and their accessories, may be dispensed with.

Indeed, some of the more important advantages of the invention will accrue also when merely a general purpose focus objective is used in the view finder. In this case, lens holder 17 with lens 75 and the mechanism for automatically controlling its position may be dispensed with, and cam member 111 may be shortened as indicated by the broken line 140 in Fig. 8 so that cam surface 112 consists only of portion 113. It then is desirable to make sure that the forward movement of inner tube 50 is stopped after position B has been engaged by cam finger 121. This may conveniently be done by suitably shortening rack 58, or by extending the front end of inner tube 50 by a length corresponding approximately to the distances $b$ and $c$ combined.

Figure 11:
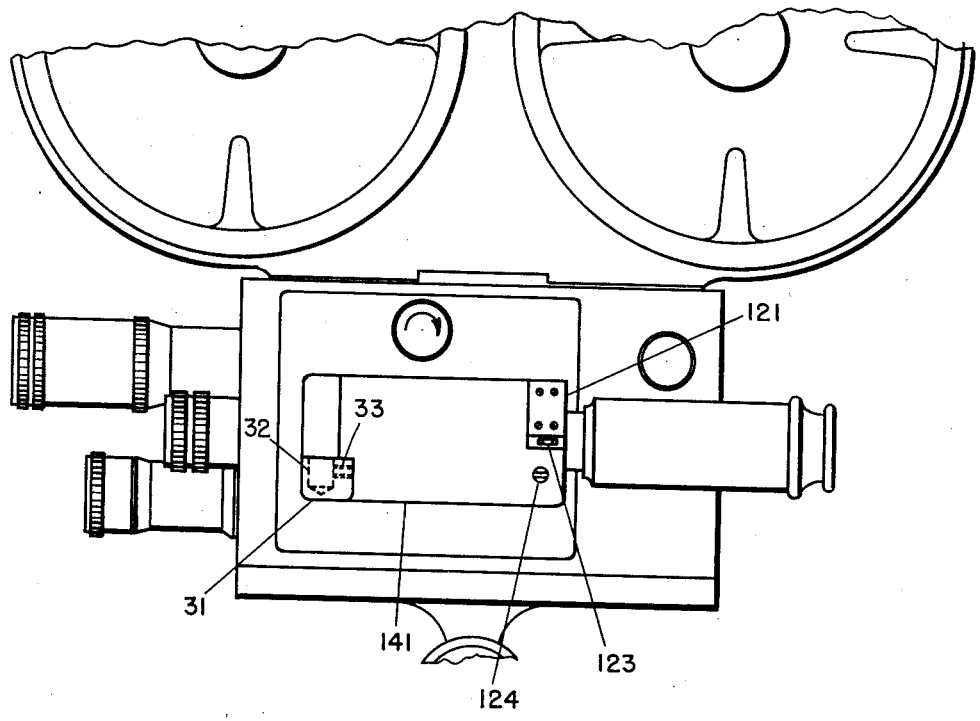
Fig. 11 is a somewhat diagrammatic side elevation on the scale of Fig. 6 of a motion picture camera showing a modification of the invention.

The invention also affords, by the provision of clamp 30 and support 37, a particularly convenient means for removably attaching the view finder to cameras of almost any construction since all that is required is that the side wall of the camera have an area sufficiently large for the mounting of support 37. But, again, enjoyment of the other advantages of the invention is not predicated upon this feature. On the contrary, it is entirely feasible to mount block 31, cam finger 121, and spring holder 124, immediately to the camera body, for example, to the housing 141 of the focusing system of the camera shown in Fig. 11.

What is claimed is:

1. In combination, a rigid camera body having a vertical shaft mounted to one of its side walls and a stationary cam finger mounted to said wall and in back of said shaft; a view finder housing pivotally supported by said shaft; and objective fixedly mounted within said housing and in front of said shaft; a ground glass mounted within said housing for movement towards and away from said objective, and being in back of said shaft; a movable cam member extending horizontally within said housing and having a cam surface, said surface being at a varying distance from said wall and engageable by said finger; and means supported by said housing for simultaneously moving said ground glass and said cam member.

2. The combination defined in claim 1, and wherein a common carrier is provided for said ground glass and said cam member.

3. In combination, a rigid camera body having a vertical shaft mounted to one of its side walls and a stationary cam finger mounted to said wall and in back of said shaft; a view finder housing pivotally supported by said shaft, said housing consisting of a front cap which is in front of said shaft and of a shell which substantially extends rearwardly of said shaft and has a base plate; an objective fixedly mounted within said front cap; a ground glass and a horizontally extending elongated cam member within said shell; a common carrying means for said ground glass and said member, said means being slideably attached to said base plate and said member having a cam surface which is at a varying distance from said wall and engageable by said finger; and means supported by said shell for moving said carrying means along said base plate and toward and away from said front cap.

4. The combination defined in claim 3, and wherein said carrying means is a plate carrying on its top side said ground glass and on its bottom side said member.

5. The combination defined in claim 4, and wherein a dove-tail is provided on said bottom side and adjacent said member; said dove-tail fitting a way on the top side of said base plate.

6. In combination, a rigid camera body having a vertical shaft mounted to one of its side walls and a stationary cam finger mounted to said wall and in back of said shaft; a view finder housing pivotally supported by said shaft, said housing consisting of a front cap which is in front of said shaft and of a shell which substantially extends rearwardly of said shaft and has a base plate; a dovetail way on the top side of said base plate; an objective fixedly mounted within said front cap; a ground glass and a horizontally extending elongated cam member within said shell; a plate carrying on its top side said ground glass and on its bottom side said member, and having on said bottom side and adjacent said member a dove-tail which fits said way; means supported by said shell for slideably moving said plate towards and away from said front cap; and, on said member, a cam surface which is at a varying distance from said wall and engageable by said finger.

7. The combination defined in claim 6, and wherein said means include: a rack mounted within a recessed portion of said dove-tail; a shaft mounted for rotation on said base plate and within the area of said way, said shaft having a top end extending into said shell and a bottom end protruding from said shell; a pinion on said top end and in mesh with said rack; and a knob on said bottom end for rotating said shaft.

8. In combination, a camera having a vertical shaft mounted to one of its side walls and a cam finger mounted to said wall and in back of said shaft; a view finder housing pivotally supported by said shaft; an objective having a focal length and being fixedly mounted within said housing and in front of said shaft; a ground glass and a horizontally extending elongated cam member within said housing, said member having a cam surface which is at a varying distance from said wall; a common carrier for said ground glass and said member, said carrier being in back of said shaft and movable towards and away from said objective over a distance; and an auxiliary lens mounted within said housing for interposition between said objective and said ground glass so as to alter said focal length: Said interposition being effected by said carrier as it moves towards said objective over part of said distance, and said cam surface having two active portions which are successively engageable by said finger and one of which is active before said interposition has been effected, while the other is active thereafter.

9. The combination defined in claim 8, and wherein said objective is of a general purpose focus, and focal length is shortened by said lens.

10. In combination, a camera having a vertical shaft mounted to one of its side walls and a cam finger mounted to said wall and in back of said shaft; a view finder housing pivotally supported by said shaft; an objective having a focal length and being fixedly mounted within said housing and in front of said shaft; a ground glass and a horizontally extending elongated cam member within said housing, said member having a cam surface which is at a varying distance from said wall; a common carrier for said ground glass and said member, said carrier being in back of said shaft and movable towards and away from said objective over a distance; an auxiliary lens mounted within said housing for movement from an inactive position to a position between said objective and said ground glass, said movement being effected by said carrier as it moves towards said objective over part of said distance and said cam surface having two active portions which are successively engageable by said finger and one of which is active before said movement has been effected, while the other is active thereafter; and means for automatically returning said lens to its inactive position when said carrier moves away from said objective over said part of said distance.

11. In combination, a camera having a vertical shaft mounted to one of its side walls and a cam finger mounted to said wall and in back of said shaft; a view finder housing pivotally supported by said shaft; an objective having a focal length and being fixedly mounted within said housing and in front of said shaft; a ground glass and a horizontally extending elongated cam member within said housing; a common carrier for said ground glass and said member, said carrier being movable towards and away from said objective over a distance; a lens and a holder therefor within said housing, said holder having a pivot in front of said shaft; mechanism for swinging said holder about its pivot so as to interpose said lens between said objective and said ground glass whereby said focal length is altered, said mechanism being actuated by said carrier as it moves towards said objective over part of said distance; and, on said member, a cam surface being at a varying distance from said wall and engageable by said finger, and having a first active portion for use with said focal length and a second active portion for use with said altered focal length.

12. The combination defined in claim 11 wherein said surface has an idling portion between said first and second active portions, and wherein said carrier actuates said mechanism while said idling portion is engaged by said finger.

13. In combination, a camera having a vertical shaft mounted to one of its side walls and a cam finger mounted to said wall and in back of said shaft; a view finder housing pivotally supported by said shaft, said housing consisting of a front cap which is in front of said shaft and of a shell which substantially extends rearwardly of said shaft and has a base; an objective having a focal length and being fixedly mounted within said front cap; a ground glass and a horizontally extending elongated cam member within said shell; a common carrier for said ground glass and said member, said carrier being movable towards and away from said front cap; a lens and a holder therefor within said housing, said holder having a pivot on said front cap; mechanism for swinging said holder about its pivot so as to move said lens from an inactive position to a position between said objective and said ground glass whereby said focal length is altered; and, on said member, a cam surface being at a varying distance from said wall and engageable by said finger, and having a first active portion for use with said focal length, a second active portion for use with said altered focal length and an idling portion between said first and second active portions; said carrier actuating said mechanism while it moves towards said front cap and while said idling portion is engaged by said finger, and said mechanism including: a pinion on said holder; a gear segment and a first lever on said base, said gear segment and said first lever having a common pivot, said gear segment being in mesh with said pinion, and said first lever being operatively connected to said gear segment; and a second lever pivotally mounted on said carrier and being adapted to engage said first lever when said finger starts to engage said idling portion.

14. The combination defined in claim 13, and wherein spring means are provided for returning said lens to its inactive position when said carrier moves away from said front cap and said idling portion is engaged by said finger.

JOHN A. MAURER, Jr.

REFERENCES CITED

The following references are of record in the file of this patent:

UNITED STATES PATENTS

| Number | Name | Date |
|---|---|---|
| 1,297,704 | Leonard | Mar. 18, 1919 |
| 1,566,217 | Krone | Dec. 15, 1925 |
| 1,637,529 | Mitchell | Aug. 2, 1927 |
| 2,012,515 | Mitchel | Aug. 27, 1935 |
| 2,017,249 | Howell | Oct. 15, 1935 |
| 2,040,422 | Austin | May 12, 1936 |
| 2,167,436 | Hinline | July 25, 1939 |

FOREIGN PATENTS

| Number | Country | Date |
|---|---|---|
| 543,554 | France | June 7, 1922 |
| 629,024 | Germany | Apr. 21, 1936 |